United States Patent
Carpenter et al.

(10) Patent No.: US 8,949,407 B2
(45) Date of Patent: Feb. 3, 2015

(54) CAPTURING A COMPUTING EXPERIENCE

(75) Inventors: Todd L. Carpenter, Monroe, WA (US); David Abzarian, Kirkland, WA (US); Seshagiri Panchapagesan, Redmond, WA (US); Harish S. Kulkarni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 715 days.

(21) Appl. No.: 12/486,069

(22) Filed: Jun. 17, 2009

(65) Prior Publication Data

US 2010/0325258 A1   Dec. 23, 2010

(51) Int. Cl.
| | | |
|---|---|---|
| *G06F 15/173* | (2006.01) | |
| *G06F 11/34* | (2006.01) | |
| *G06Q 30/02* | (2012.01) | |
| *G06F 15/16* | (2006.01) | |
| *G06F 15/177* | (2006.01) | |

(52) U.S. Cl.
CPC ............ *G06F 11/3414* (2013.01); *G06Q 30/02* (2013.01); *G06F 11/3438* (2013.01)
USPC ............................ 709/224; 709/245; 715/736

(58) Field of Classification Search
USPC .............. 709/224; 705/7.11, 7.29, 7.32, 14.1, 705/14.19, 14.25, 14.39
See application file for complete search history.

(56) References Cited

U.S. PATENT DOCUMENTS

| | | | |
|---|---|---|---|
| 5,838,790 A | 11/1998 | McAuliffe et al. | |
| 6,662,226 B1 * | 12/2003 | Wang et al. | 709/224 |
| 6,839,680 B1 | 1/2005 | Liu et al. | |
| 7,080,139 B1 * | 7/2006 | Briggs et al. | 709/224 |
| 7,155,663 B2 | 12/2006 | Landsman et al. | |
| 7,222,105 B1 | 5/2007 | Romansky | |
| 7,502,797 B2 * | 3/2009 | Schran et al. | 1/1 |
| 7,711,207 B2 * | 5/2010 | Pollard et al. | 382/293 |
| 2002/0082929 A1 | 6/2002 | Wang et al. | |
| 2002/0112048 A1 * | 8/2002 | Gruyer et al. | 709/224 |
| 2003/0192060 A1 | 10/2003 | Levy | |
| 2005/0182676 A1 | 8/2005 | Chan | |
| 2005/0278630 A1 * | 12/2005 | Bracey | 715/704 |
| 2006/0004630 A1 | 1/2006 | Criddle et al. | |
| 2006/0015613 A1 | 1/2006 | Greaves et al. | |
| 2007/0239546 A1 | 10/2007 | Blum et al. | |
| 2007/0255617 A1 | 11/2007 | Maurone et al. | |
| 2008/0046218 A1 | 2/2008 | Dontcheva et al. | |
| 2008/0052392 A1 * | 2/2008 | Webster et al. | 709/224 |
| 2008/0059571 A1 | 3/2008 | Khoo | |
| 2009/0019354 A1 | 1/2009 | Jaiswal et al. | |
| 2009/0030801 A1 * | 1/2009 | Meggs | 705/14 |
| 2009/0158318 A1 | 6/2009 | Levy | |
| 2009/0240800 A1 * | 9/2009 | Yee | 709/224 |
| 2010/0042718 A1 * | 2/2010 | Morris | 709/224 |

(Continued)

OTHER PUBLICATIONS

Wikipedia, "Remote Desktop Protocol", May 23, 2009.*

(Continued)

*Primary Examiner* — Wen-Tai Lin

(74) *Attorney, Agent, or Firm* — Steve Wight; Judy Yee; Micky Minhas

(57) ABSTRACT

The described implementations relate to capturing a computing experience. In one case, a user session capture tool can launch a remote user session where a user-interface and user inputs are gathered from a single computing device. Remote user session data produced by the remote user session can be analyzed to determine user activity.

20 Claims, 5 Drawing Sheets

(56) References Cited

U.S. PATENT DOCUMENTS

2010/0058446 A1* 3/2010 Thwaites ............... 726/4
2010/0312653 A1 12/2010 Carpenter et al.

OTHER PUBLICATIONS

Claypool, et al."Inferring User Interest", Retrieved at<<http://ieeexplore.ieee.org/stamp/stamp.jsp?tp=&arnumber=968829&isnumber=20897>>, 2001 IEEE, pp. 8.

Paganelli, et al."Intelligent Analysis of User Interactions with Web Applications", Retrieved at<<http://giove.isti.cnr.it/cameleon/pdf/iui02.pdf>>, pp. 8.

Vuckovic, Vesna, "Digital Watermark", Retrieved at <<http://www.ncd.matf.bg.ac.yu/casopis/05/Vuckovic/Vuckovic.pdf>>, 2004, pp. 59-62.

"AdServer for CMS 2002", Retrieved at <<http://www.asp.net/community/control-gallery/Item.aspx?i=384>>, Mar. 20, 2009, pp. 2.

Edelman, Ben, "Ad Injection", Retrieved at <<http://www.2-spyware.com/news/post108.html>>, Mar. 20, 2009, pp. 2.

Kim, et al., "New Approach for Secure and Efficient Metering in the Web Advertising", Retrieved at <<http://www.springerlink.com/content/ce05lf84jym97da8/fulltext.pdf>>, ICCSA 2004, LNCS 3043, 2004, pp. 215-221.

"Non-Final Office Action for U.S. Appl. No. 12/478,786", Mailed Date: May 20, 2011, 19 pages.

"Response to Non-Final Office Action for U.S. Appl. No. 12/478,786", Filed Date: Sep. 19, 2011, 11 pages.

"Final Office Action for U.S. Appl. No. 12/478,786", Mailed Date: Oct. 28, 2011, 22 pages.

"Response to Final Office Action for U.S. Appl. No. 12/478,786", Filed Date: Dec. 28, 2011, 11 pages.

"Advisory Action for U.S. Appl. No. 12/478,786", Mailed Date: Feb. 17, 2012, 3 pages.

"Request for Continued Examination for U.S. Appl. No. 12/478,786", Mailed Date: Feb. 24, 2012, 3 pages.

"Non-Final Office Action for U.S. Appl. No. 12/478,786", Mailed Date: Mar. 15, 2012, 21 pages.

"Applicant Initiated Interview Summary for U.S. Appl. No. 12/478,786", Mailed Date: May 21, 2012, 3 pages.

"Response to Non-Final Office Action for U.S. Appl. No. 12/478,786", Filed Date: Jul. 3, 2012, 14 pages.

"Final Office Action for U.S. Appl. No. 12/478,786", Mailed Date: Dec. 7, 2012, 28 pages.

"Request for Continued Examination and Response to Final Office Action for U.S. Appl. No. 12/478,786", Filed Date: Feb. 28, 2013, 17 pages.

* cited by examiner

CAPTURING A COMPUTING EXPERIENCE

BACKGROUND

There are various scenarios where people would like to view or validate the display contents (i.e., audio and/or video) on a particular computer's monitor. For example, consider the case of software or websites where advertisements are displayed to the user to generate revenue. The software/website creator could charge more money to display the advertisement if they could prove the advertisement was actually displayed to the user, and not thwarted by malicious software. In addition, there is a desire by many parents to review the contents of the websites their children visit. It is not feasible, nor practical for a parent to watch over the shoulder of their children every time they are on the web.

SUMMARY

The described implementations relate to capturing a computing experience. In one case, a user session capture tool can capture a computing experience of a computing device using a remote user session. The computing experience can be thought of as including a user-interface presented by the computing device and associated user-input. The user session capture tool can create or obtain remote user session data associated with the computing experience. The remote user session data can include a remote user session representation. The user session capture tool can present the remote user session representation on the computing device. In some instances, the presenting can entail launching or invoking a user session capture technique that generates the remote user session representation. The user session capture tool can also analyze the remote user session data to detect occurrences of interest.

In another case, a user session capture tool can launch a remote user session where a user-interface and user inputs are gathered from a single computing device. Remote user session data produced by the remote user session can be analyzed to determine user activity.

The term user session capture tool or "USC tool(s)" may refer to device(s), system(s), computer-readable instructions (e.g., one or more computer-readable media having executable instructions), component(s), module(s), and/or methods, among others, as permitted by the context above and throughout the document. In various instances, USC tools may be implemented as hardware, software, firmware, or combination thereof. The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent application relates to capturing a computing experience. Some implementations can capture the computing experience utilizing a user session capture tool (USC tool). One such example can be seen in introductory FIG. 1. The USC tool can leverage underlying mechanisms that enable remote user sessions to capture inputs and/or outputs of a user's computing experience.

Figure 1:
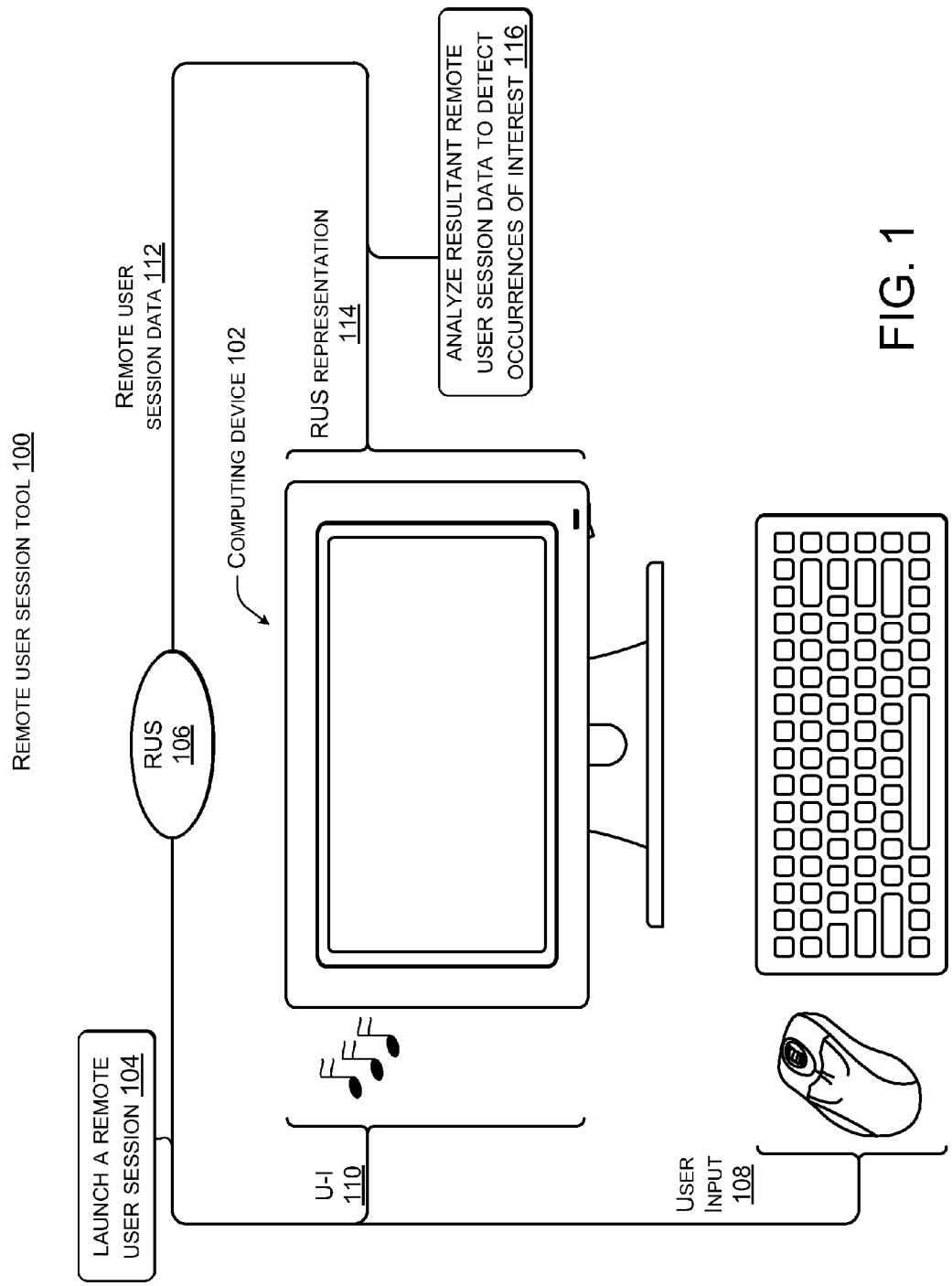
FIG. 1 illustrates an example of a user session capture tool for capturing a computing experience in accordance with some implementations of the present concepts.

FIG. 1 shows a USC tool 100 that can capture a computing experience associated with computing device 102. For instance, as indicated at 104, the USC tool can launch a remote user session 106. The remote user session 106 can capture a user's computing experience of computing device 102. In this case, the computing experience is represented as user-input 108 and device output or user-interface 110.

The remote user session 106 can output remote user session data 112 that captures the computing experience of computing device 102. The computing experience can be thought of including most or all of the activity associated with the computing device, such as what is presented on the computing device, what devices are coupled to the computing device, information that is input/output from the computing device, etc. For instance, the remote user session data can include a remote user session representation 114 of user-interface 110 that can be presented on computing device 102.

For purposes of explanation, remote user session representation 114 can be thought of as being superimposed over user-interface 110 so that the user actually sees his/her changes reflected in the remote user session representation and does not actually see the user-interface. The remote user session 106 can repeatedly gather information and can generate a stream of remote user session representations in a seamless fashion. In such a configuration, once the remote user session is underway, the user may not even be aware that he/she is viewing a remote user session representation rather than the actual user-interface. Further, in some cases, the USC tool 100 can automatically launch the remote user session 106 in a manner that is generally imperceptible to the user. For instance, the USC tool can launch the remote user session responsive to the user logging-in so that the first display that the user sees is actually remote user session representation 114. In such a configuration the user of the computing device 102 may not even be aware that he/she is participating in a remote user session. In such a case, the remote user session representation can be thought of as being the user-interface.

In some implementations, USC tool 100 can analyze the remote user session data 112 to detect occurrences of interest at 116. An occurrence of interest can be anything captured by the remote user session 106 as part of the computing experience. For instance, occurrences of interest can include any combination of what was presented to the user on the computing device 102 and/or the user's inputs to the computing device. For example, USC tool 100 can analyze the remote user session data 112 to determine what was presented on the user-interface as part of the computing experience. For instance, USC tool 100 can analyze the remote user session data 112 to determine what visual content and/or audio content was presented on the user-interface. Alternatively or additionally, the USC tool 100 can analyze the remote user session data 112 to determine the user input to the computing device 102. For instance, the USC tool can analyze the remote user session data 112 to determine what keystrokes the user entered. Similarly, the USC tool 100 can determine a mouse position, movement and/or clicks from the remote user session data 112. Further still, the USC tool can analyze the remote user session data to determine audio input and/or output of the computing device. Stated another way, the USC tool can analyze the user's audio input, such as may be received by a microphone attached to the computing device. Alternatively or additionally, the USC tool can analyze audio content that was sent to speakers of the computing device.

The USC tool 100 can utilize detected occurrences of interest in several scenarios. For instance, assume that the USC tool detects that specific content, such as specific advertising content was presented on the computing device. In such a case, the USC tool can cause the user to be rewarded in some manner. Conversely, if the detected occurrence of interest relates to inappropriate content then the USC tool can take other action. For instance, the USC tool can cause a source of the content to be blocked and/or change a permission level of the user. Other examples of actions that can be taken by the USC tool responsive to detecting occurrences of interest are discussed below.

In summary, the present concepts can utilize remote user session technologies to invoke a remote user session on a computing device. The remote user session can capture a computing experience and capture remote user session data that reflects the computing experience. This remote user session data can be leveraged for several different purposes as is discussed above and below.

Summarized from another perspective, a remote user session can be thought of as a process that leverages a defined protocol for capturing a user's computing experience. For instance, in relation to Microsoft brand Windows® Operating System (OS), the defined protocol is known as remote desktop protocol (RDP). The defined protocol can be configured to convert a computing experience into a compressed packet stream. The present implementations can manipulate where and/or how the defined protocol gathers the user's computing experience (i.e., the input). The present implementations can also manipulate where the defined protocol's output is directed and what is done with the output.

For ease of explanation, the above examples involve a one-to-one relationship between a user and a computing device (i.e. the computing experience is the user's computing experience). In cases where the computing device is configured to support multiple users, the user session capture techniques described above and below can be repeated for individual users so that each individual user's computing experience can be captured and analyzed.

First System Example

Figure 2:
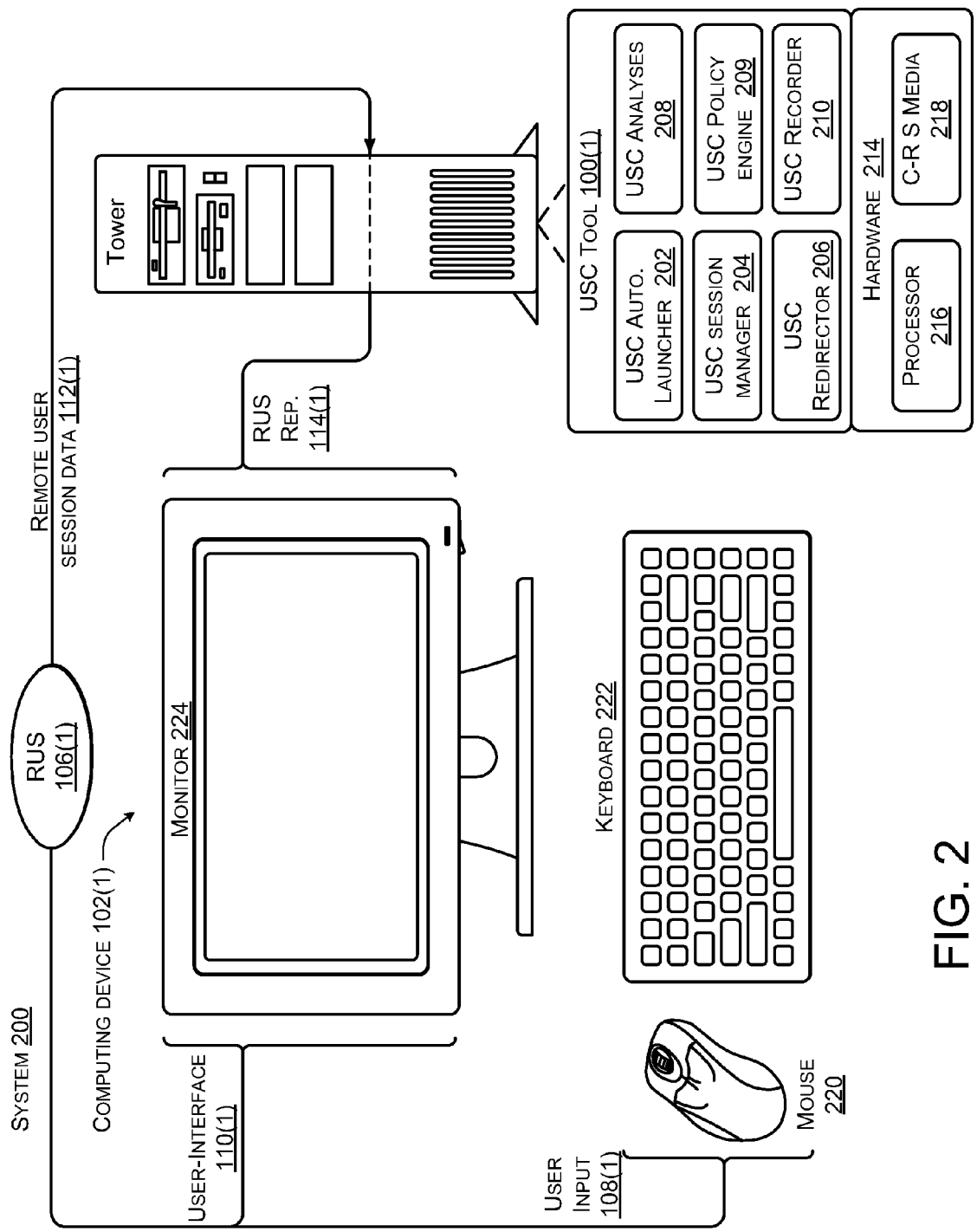
FIGS. 2-3 illustrate examples of systems for capturing a computing experience in accordance with some implementations of the present concepts.

FIG. 2 offers a system 200 for capturing a user's computing experience associated with computing device 102(1). In this case, computing device 102(1) includes a USC tool 100(1). The USC tool can include a USC automatic launcher 202, a USC session manager 204, a USC redirector 206, a USC analyzer 208, a USC policy engine 209, and a USC recorder 210. Computing device 102(1) also includes hardware 214.

(As used herein, the parenthetical suffix of a designator (i.e., "(1)", "(2)", etc) is utilized to indicate further implementations of a component).

In this case, the hardware 214 includes a processor 216 and computer-readable storage media 218. The computer readable storage media can store computer-readable instructions which can be processed on the processor. The hardware can also include input devices and output devices. In this case, input devices are represented by a mouse 220 and a keyboard 222. Output devices are represented by monitor 224. In this case, the monitor can present a visual display and present sound through speakers (not specifically shown).

USC automatic launcher 202 can cause a remote user session 106(1) to be automatically launched on computing device 102(1). Launching the remote user session can capture a user's computing experience of computing device 102(1).

USC session manager 204 can cause the remote user session to gather a computing experience associated with computing device 102(1). In this case, the USC session manager can cause both the user-input 108(1) and user-interface 110(1) to be gathered from computing device 102(1). In contrast, traditional remote user sessions tend to gather user-input from a first computing device and an output or user-interface from a second computing device. For example, user input is gathered from a client device and sent to a server device. The server's user-interface is updated based upon the user-input. A representation of the server's user-interface is then remoted to the client device to be displayed for the user and the process is repeated. In summary, here the USC session manager can cause the computing device's user-input 108(1) and user-interface 110(1) to be used in generating the remote user session. In cases where the remote user session is captured and analyzed on the computing device the USC session manager may adjust bandwidth constraints associated with capturing the remote user session compared to traditional scenarios. For instance, in traditional remote user session scenarios, reducing network bandwidth usage tends to be an over-riding priority. However, when the remote user session occurs and is captured and analyzed on the same computing device, bandwidth constraints are less of an issue. As such, the USC tool may decrease data compression of the remote user session to gain further information and/or quality of information.

USC redirector 206 can receive remote user session data 112(1) that is generated by the remote user session 106(1). In many instances, the remote user session data is in the form of a stream of data that can include bit map images. The USC redirector can cause these bit map images to be presented on computing device 102(1) as remote user session representation 114(1). In summary, the USC redirector can cause a remote user session representation of the computing experience to be presented on the computing device.

USC analyzer 208 can analyze the remote user session data 112(1) to determine whether specific content is contained in the data.

USC policy engine 209 can obtain information from the USC analyzer 208 regarding the remote user session and identify an appropriate response. The response can be a positive response, such as a reward for the user, or a negative response such as a user punishment. The USC policy engine can employ various fixed or learning algorithm(s) to identify the appropriate response. Various examples of appropriate responses are described above and below. Viewed another way, the USC policy engine can have access to a generic access control policy that defines specific inputs and/or outputs. The USC policy engine can enforce the access control policy relative to captured user inputs/outputs.

USC recorder 210 can cause at least a portion of the remote user session data to be stored. For instance, the USC recorder can cause remote user session data to be stored on computer-readable storage media 218. In some cases the USC recorder can cause all of the remote user session data to be stored. In other cases, the USC recorder can cause portions of the remote user session data to be stored. For example, the portions may relate to a particular aspect of the remote user session data. For instance, the USC recorder may cause only the RUS representation 114(1) portion of the remote user session data 112(1) to be stored. In another case, the portion that is recorded may be time based. For example, every 30 seconds the USC recorder could cause 1 second of the remote user session data to be stored. In some cases, where only a portion of the remote user session is stored, the USC tool may request a screen update so that the portion is more likely to contain desired data. The screen update can relate to the entire screen or portions of the screen.

In still another case, the portion that is stored can be relative to whether any occurrences of interest have been detected in the remote user session data. For instance, the USC recorder 210 can be set to default to storing one out of every ten seconds of remote user session data unless the USC analyzer 208 detects an occurrence of interest, at which point the USC recorder 210 records all of the remote user session data.

The stored remote user session data can be utilized in other ways. For instance, in one hypothetical scenario the stored remote user session data can show how a user utilized features of an application running on the computing device. The stored remote user session data can be utilized to make a training film that can be distributed to others. In still other instances, the stored remote user session data can be utilized as forensic proof of a policy violation and/or crime.

Second System Example

Figure 3:
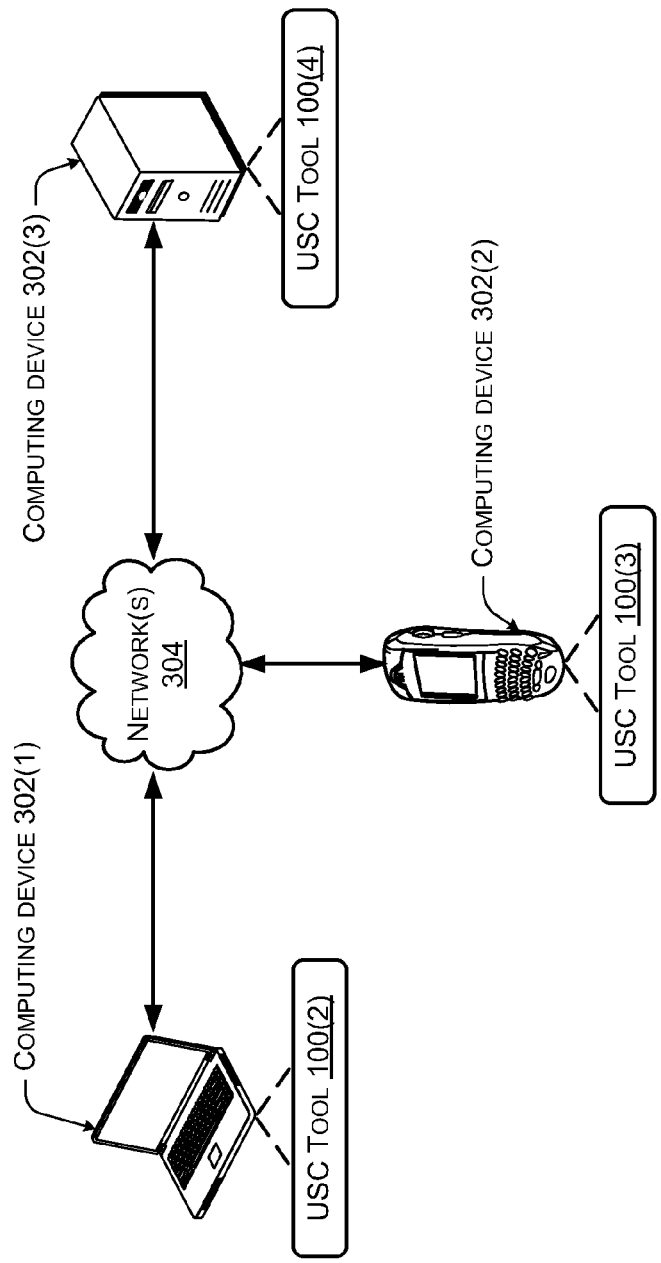

FIG. 3 offers a system 300 for capturing a computing experience of a computing device. System 300 includes three computing devices 302(1), 302(2), and 302(3), though any number of computing devices can be employed. The computing device can be coupled via one or more networks 304, such as a local area network and/or a wide area network, such as the Internet.

In this case, computing devices 302(1) is manifested as a notebook computer, computing devices 302(2) is manifested as a Smartphone, and computing devices 302(3) is manifested as a desktop computing device or server. In other cases, computing devices can be manifest as cell phones, personal digital assistants (PDAs), netbooks, or any other type of ever-evolving types of computing devices.

In this implementation, individual computing devices 302(1)-302(3) include USC tools 100(2)-100(4), respectively. This configuration can allow a remote user session to be launched on an individual computing device to capture a computing experience of that device. Some implementations can allow multiple remote user sessions to be launched on a computing device, such as where the computing device supports multiple different users.

The captured computing experience(s) can then be analyzed to detect occurrences of interest. For instance, USC tool 100(2) can launch a remote user session on computing device 302(1) to capture a computing experience of the computing device. USC tool 100(2) can then analyze the computing experience to detect occurrences of interest. This process can be accomplished exclusively on computing device 302(1). One such example is described in detail above relative to FIG. 2.

Alternatively, USC tools on different computing devices can operate cooperatively to capture and/or analyze a computing experience of an individual computing device. For example, USC tool 100(2) can launch a remote user session on computing device 302(1) to capture a computing experience of the computing device. USC tool 100(2) can then send some or all of the computing experience to computing device 302(3). On computing device 302(3), USC tool 100(4) can analyze the computing experience of computing device 302(1) to detect occurrences of interest.

Actions can be taken on either or both of computing device 302(1) and/or 302(3) if occurrences of interest are detected. For instance, USC tool 100(4) may downgrade computing device 302(1)'s network access in an instance where nefarious occurrences of interest are detected. For instance, the nefarious occurrences may be actions, such as mouse clicks and/or keystrokes by the user to try to gain access to sensitive material on computing device 302(1) and/or network 304. In another example, the nefarious occurrences may relate to content that was displayed on computing device 302(1). For instance, heuristic analysis can be utilized to examine whether inappropriate adult-related content is contained in remote user session representations of computing device 302(1).

Still other implementations can analyze multiple aspects of remote user session data to detect nefarious occurrences. For instance, some implementations can analyze user-input contained in the remote user session data and the bit map images (i.e. the remote user session data). Such a configuration can be more determinative of user intent than analyzing a single aspect of the remote user session data. For instance, consider that the user types in a web-site address and adult content is displayed on the screen. The user may have typed the address by mistake or not realized the nature of the web-site. Thus, analyzing only the user's keystrokes can give ambiguous results.

A USC tool that analyzes multiple aspects of the remote user session data can decrease or eliminate this ambiguity. For instance, the USC tool can analyze the remote user session data relative to user-input, displayed content, and/or a time duration that the content was displayed. Thus, this can allow the USC tool to distinguish inadvertent user errors from intentional actions. For example, if the user is genuinely surprised at the content that is displayed resultant to going to the website, then the user will probably quickly close the window, say within 1-2 seconds. In contrast, if the user intended to go to the web-site and expected to see particular content, then the user will probably keep the window open longer. The USC tool can distinguish these scenarios so that the analysis of the remote user session data provides more meaningful and/or accurate results.

To summarize, for an instance in time (i.e., time interval) the USC tool can analyze what was displayed and the user inputs associated with that display (i.e., what did the user type in and/or how long did he/she leave the content on the screen).

The configuration describe above can also be scaled across a set of computing devices, such as those of an organization. For instance, in system 300, USC tool 100(2) can launch one or more remote user sessions on computing device 302(1). Similarly, USC tool 100(3) can launch one or more remote user sessions on computing device 302(2). Remote user session data from computing devices 302(1) and 302(2) can be sent in real-time or at a subsequent point to computing device 302(3). Analysis of the remote user session data can be performed on computing device 302(3) to monitor user behavior associated with computing devices 302(1) and 302(2). Of course, this process can be expanded so that a server receives user experiences from any number of computing devices beyond the two described here. Further, the server can handle multiple different user experiences per computing device that supports multiple users.

For example in one organization, USC tools 100(2) and 100(3) can send remote user session data to USC tool 100(4). Thus, the user's computing experiences of computing devices 302(1) and 302(2) can be monitored and/or analyzed from computing device 302(3). For instance, USC tool 100(2) can store remote user session data locally and periodically send a portion of that data to the USC tool 100(4). Say for instance, that every five seconds, USC tool 100(2) sends a bit map image of its remote user session data to computing device 302(3) and similarly, USC tool 100(3) does the same with its data. The bit map images can be displayed on computing device 302(3) so that an administrator of the organization can monitor the respective computing experiences. If the administrator finds any occurrences of interest, then more saved and/or real-time remote user session data can be obtained from the respective computing device. This configuration can reduce network bandwidth consumption while allowing the opportunity to retrieve further remote user session data as desired.

The above examples involve analyzing a user's computing experience of a computing device to detect undesired user behavior. However, these same concepts can be employed to detect desired user behavior. For instance, the remote user session data from a computing device can be analyzed to detect desired occurrences of interest. For instance, suppose that the user of computing device 302(1) is offered a reward for watching and/or listening to specific advertising content.

USC tool 100(2) (and/or an USC tool on another computing device) can analyze remote user session data from the computing device to validate that the specific advertising content was presented on the computing device. For instance, the USC tool can perform a function on the remote user session data using one of several validation methods. Some implementations can employ pattern matching to validate that specific content was presented on the computing device. For instance, the specific content can be obtained from a source of the content, such as a website. The remote user session representation can be analyzed to identify whether the specific content is contained in the representation.

In another case, the present techniques can be utilized to validate that a user, such as an employee has 'watched' a mandated corporate video. For instance, these techniques could identify whether the corporate video was obstructed by another window during presentation. These techniques can also be applied in digital rights management scenarios. For instance, if the user plays a song or a movie, that occurrence can be captured as part of the user's computing experience. The present techniques can be applied to determine whether the user did or did not have permission to play the song or the movie. Some implementations could even stop the playing if the user does not have permission.

In some cases, the validation method can entail performing a steganographic calculation on the remote user session data. In another case, the method can entail performing a hash function or finger printing algorithm. In a further case, the validation can entail a watermark calculation. Any one or multiple methods can be performed to determine whether the specific advertising content was presented on the computing device.

In an instance where the USC tool's analysis of the remote user session data validates that the specific advertising content was presented on computing device 302(1) then the USC tool can cause some type of reward to be given to the user. For instance, the USC tool 100(4) can cause some type of reward, such as money or points to be deposited in an account associated with the user.

Building upon the above examples, some implementations can adjust user authorizations or permissions based upon detected occurrences of interest. For instance, if the analysis indicated that the user viewed inappropriate or sensitive content or tried to access sensitive content, then the user's system authorization can be lowered. Conversely, if the user does something beneficial then his/her authorization can be increased. For instance, assume that an organization wants its employees to read a memorandum that emphasizes the importance of not disclosing the organization's trade secrets. The USC tool can analyze the remote user session data from the user's computer to determine whether the user opened the memorandum and how long the memo was displayed on the screen. If the analysis indicates that the memo was displayed for a predefined period of time then the user probably read the memo. The user's system authorization can then be elevated to allow the user to view trade secret documents. Whether specific content was displayed and for how long are just two examples of parameters that can be utilized to adjust the user's system authorization level or access control permissions.

Third System Example

Figure 4:
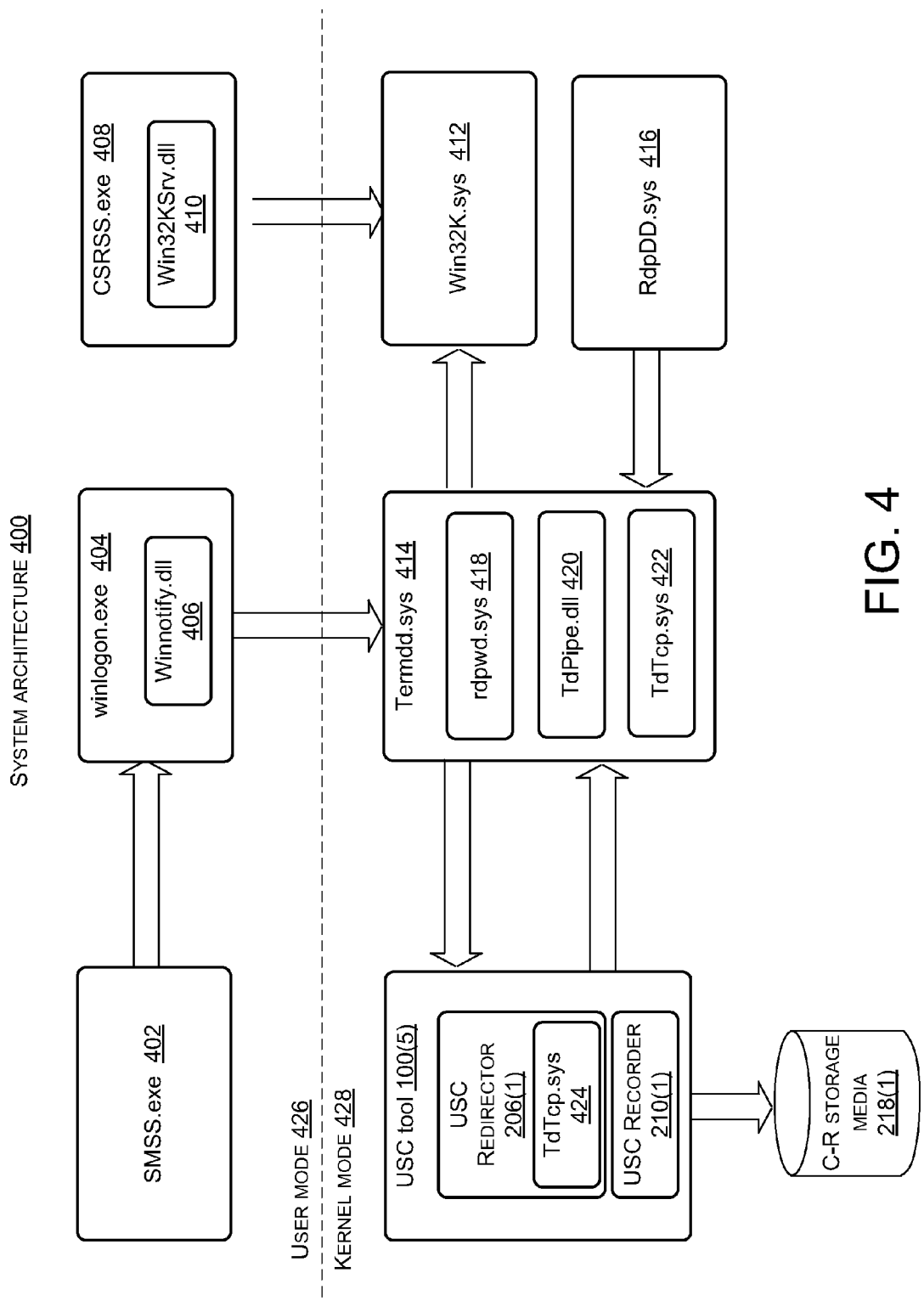
FIG. 4 illustrates an example of system architecture for capturing a computing experience in accordance with some implementations of the present concepts.

FIG. 4 shows a system architecture 400 for capturing a computing experience of a computing device in accordance with one implementation. The discussion relative to FIGS. 1-3 above can relate to potentially any type of operating system that supports (or can support) remote user sessions. The particular system architecture of FIG. 4 is an example that relates to a Windows-brand Operating System offered by Microsoft® Corporation. As such, the remote user session techniques are described relative to Microsoft's remote desktop protocol (RDP) that supports what are termed as 'terminal services sessions'. A terminal services session can be thought of as one variation of a remote user session.

System architecture 400 includes a SMSS.exe component 402 and a winlogon.exe component 404. The winlogon.exe component includes a Winnotify.dll component 406. System architecture 400 also includes a CSRSS.exe component 408 that includes a Win32KSrv.dll component 410.

System architecture 400 further includes a Win32K.sys component 412, a Termdd.sys component 414, and a Rdp-DD.sys component 416. Termdd.sys component 414 includes a rdpwd.sys component 418, a TdPipe.dll component 420, and a TdTcp.sys component 422. The system architecture also includes USC tool 100(5). The USC tool includes illustrated components in the form of USC redirector 206(1), USC recorder 210(1) and computer-readable storage media 218(1). In this instance, USC redirector 206(1) includes a TdTcp.sys component 424.

System architecture 400 is divided into user mode 426 and kernel mode 428. Kernel mode is useful in that it tends to be secure from user meddling. As such information gathered in kernel mode tends to have a higher reliability than information gathered in user mode.

SMSS.exe component 402 is the session manager subsystem and is responsible for handling session creation for the operating system. The SMSS.exe component also launches the winlogon process, creates environment variables and starts Win32 subsystems.

Information from the SMSS.exe component 402 is communicated to winlogon.exe component 404. The winlogon.exe component via Winnotify.dll component 406 handles user logons and logoffs and processes certain Windows key combinations, such as (CTRL+ALT+DEL). The winlogon.exe component is responsible for starting the Windows shell, such as Windows Explorer. Information from the winlogon.exe component is sent to the kernel mode's Termdd.sys component 414.

CSRSS.exe component 408 handles process and thread management via the Win32KSrv.dll component 410. Information from the CSRSS.exe component is sent to the kernel mode's Win32K.sys component 412. Win32K.sys component 412 manages the Windows graphical user-interface and routes input to applications.

Termdd.sys component 414 is a terminal services device driver that provides the run-time for network specific components and listens for RDP client connections on TCP port 3389. The Termdd.sys component sends information to the Win32K.sys component 412 and the USC tool 100(5).

The rdpwd.sys component 418 is the remote user session mouse and keyboard driver. TdPipe.dll component 420 is a library used for packaging session data for transport. TdTcp.sys component 422 packages the RDP protocol for the underlying network TCP/IP protocol.

The USC redirector 206(1) via TdTcp.sys 424 can operate cooperatively with TdTcp.sys 422 to cause a representation of a computing experience to be redirected back to the computing device upon which the experience was captured.

USC recorder 210(1) can cause some or all of a terminal services session (i.e., remote user session) representation of a computing experience to be stored on computer-readable storage media 218(1).

RDP can support several technologies that can be leveraged by the USC tool 100(5). One example is termed shared view. Upon start-up, the USC tool replaces the shell of the user's login session from explorer to the USC tool which can then automatically connect to the monitoring server and then launch the local explorer.exe. The USC tool can be configured to launch automatically if it was killed or exited ensuring continuous connection. In another case, the USC tool can cause remote user session processes to be inserted into the computer's software stack at start-up to start the remote session technology. These remote user session processes can then copy the input/output stream for local or remote analysis.

RDP can also include device redirectors. For instance, local devices associated with the computing device, like local printers, local clipboards, local hard drives etc) can appear as devices on the remote user session. Accordingly, the remote user session data can include data from and about these devices. For instance, this can allow the USC tool to analyze remote user session information like what files were modified on disk, what files were printed, what songs were played, etc.

Further still, RDP can support virtual channels which allow additional application or session related data to be passed over the network through a side channel. This side channel data can be treated as part of the remote user session data by the USC tool and analyzed as described above. In other cases, the side channel can be handled differently that the other portions of the user's computing experience. For instance, if the USC tool is searching for particular video content it can analyze the side channel. If the USC tool is looking for particular static content it can evaluate the main RDP channel.

While described above relative to specific remote user session protocols and/or components, the present concepts can be applied to any operating system that can be adapted to capture user session data.

Method Example

Figure 5:
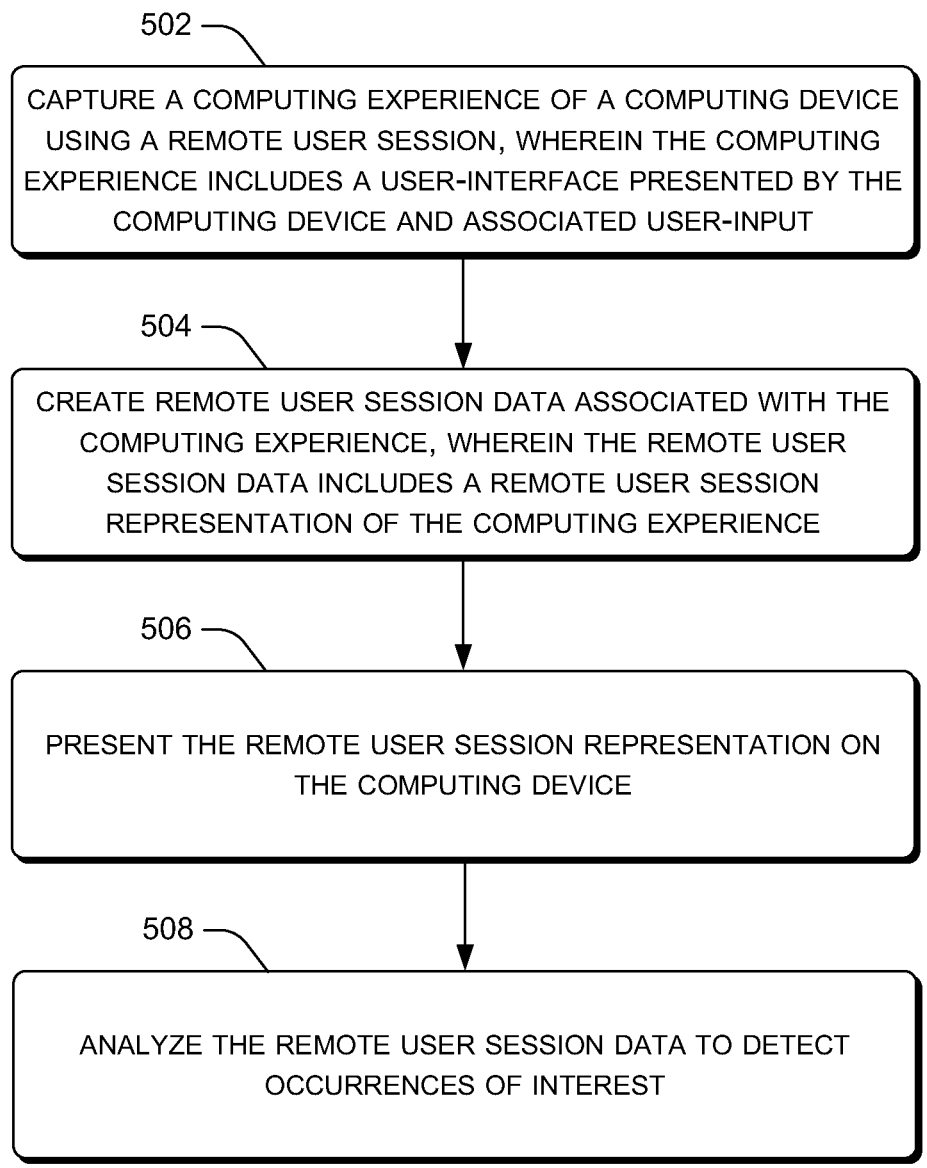
FIG. 5 is a flowchart for capturing a computing experience in accordance with some implementations of the present concepts.

FIG. 5 shows a flowchart of a remote user session method or technique 500 that is consistent with at least some implementations of the present concepts. The order in which the method 500 is described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

At block 502 the method can capture a computing experience of a computing device using a remote user session. The computing experience can include a user-interface presented by the computing device and associated user-input.

At block 504 the method can create remote user session data associated with the computing experience. The remote user session data can include a remote user session representation. In some implementations, some or all of the remote user session data, such as the remote user session representation can be stored. The remote user session data can be stored on a computing device from which the computing experience was recorded or another different computing device.

At block 506 the method can present the remote user session representation on the computing device. For instance, the remote user session representation can be super-imposed over a user-interface of the computing device. In some configurations, the remote user session representation is in a form of a stream of bit map images. The stream of bit map images can be presented on the computing device for the user in a seamless manner that is virtually indistinguishable from the actual user-interface.

At block 508 the method can analyze the remote user session data to detect occurrences of interest. Occurrences of interest can relate to what was presented audibly and/or visually (i.e., content of interest) and/or what the user did (input of interest). For instance, an occurrence of interest can be a keystroke sequence entry of interest (i.e., did the user type in the password of the organizations top secret files). In one implementation described above, the analysis can be performed by a USC analyzer.

In some cases analyzing can be performed in real-time on the remote user session data. In other cases, the analyzing can be performed on stored remote user session data. In some implementations, the analyzing can be performed on bit map images of the remote user session data. The analyzing can detect embedded or encoded content in the bit map images. For instance, the analyzing can detect steganographically embedded content, water marks etc.

The analyzing can also look for repeating sequences which can show that the user is replaying something in an attempt to try to dupe the system. For instance, the user may make a recording of an advertisement and set up a program to play the program over and over on the computing device in an attempt to receive multiple rewards for viewing the advertisement. The analyzing can look for repetitions in the remote user session data to indicate such as scenario. Since the remote user session data can contain essentially everything about the computing experience, such as mouse location and movement, it is very unlikely that a computing experience would be repeated in real life.

Various actions can be taken responsively to detection of occurrences of interest in the remote user session data. In an example described above an appropriate action can be identified by the USC policy engine. For instance, user permissions can be adjusted based upon the analysis of the remote user session data. In another case, the user can be rewarded when specific advertising content is detected in the remote user session data as an occurrence of interest.

CONCLUSION

Although techniques, methods, devices, systems, etc., pertaining to capturing a user's computing experience are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A hardware computer-readable storage media having instructions stored thereon that when executed by a hardware processor cause the hardware processor to perform acts, the acts comprising:
    launching a remote user session on a computing device; and
    while the remote user session is being conducted on the computing device and without notifying a user of the computing device that the remote user session is being conducted, using the remote user session to:
        capture a computing experience on the computing device, wherein the computing experience includes a local user-interface generated by the computing device and associated local user-input entered to the computing device by the user of the computing device;
        create remote user session data associated with the computing experience, wherein the remote user session data includes at least one Internet Protocol packet stream comprising images of the local user-interface and the remote user session data is created on the computing device where the remote user session is launched;
        redirect the at least one Internet Protocol packet stream including the images of the local user-interface back to the computing device where the remote user session is launched, the redirecting comprising sending the at least one Internet Protocol packet stream including the images of the local user-interface from the computing device to the computing device via a network port on the computing device; and
        present the images of the local user-interface included in the at least one Internet Protocol packet stream on the computing device.

2. The hardware computer-readable storage media of claim 1, wherein the remote user session is a Remote Desktop Protocol session.

3. The hardware computer-readable storage media of claim 1, the acts further comprising:
    superimposing the images of the local user-interface included in the at least one Internet Protocol packet stream over the local user-interface of the computing device so that the user views the superimposed images instead of the local user-interface.

4. The hardware computer-readable storage media of claim 1, the acts further comprising:
    analyzing the images of the local user-interface included in the at least one Internet Protocol packet stream to detect that the user has attempted to access sensitive material using the computing device.

5. The hardware computer-readable storage media of claim 1, wherein the at least one Internet Protocol packet stream that is both created by the computing device and redirected to the computing device includes input session data identifying a position, a movement, or a click of a mouse of the computing device.

6. The hardware computer-readable storage media of claim 5, wherein the at least one Internet Protocol packet stream created by the computing device is continually redirected to the computing device as the user interacts with the computing device and is continually updated during the remote user session to reflect subsequent local user-input entered to the computing device by the user.

7. The hardware computer-readable storage media of claim 1, wherein the at least one Internet Protocol packet stream comprises a Transmission Control Protocol/Internet Protocol (TCP/IP) packet stream that is communicated from the computing device to the computing device via the network port.

8. The hardware computer-readable storage media of claim 1, wherein the at least one Internet Protocol packet stream is redirected to the computing device without sending the at least one Internet Protocol packet stream to another computing device.

9. A computing device, comprising:
    a display;
    a hardware processor; and
    a computer-readable storage media storing instructions which, when executed by the hardware processor, cause the hardware processor to:
        launch a remote user session that executes on the hardware processor and captures a computing experience taking place on the computing device with a user, wherein the computing experience includes a local user-interface of the computing device; and
        while the remote user session is being conducted and as the user enters input to the computing device, repeatedly:
            incorporate the input entered to the computing device into at least one Internet Protocol packet stream;
            update the local user-interface of the computing device responsive to the input entered to the computing device;
            obtain images of the updated local user-interface of the computing device and incorporate the images of the updated local user-interface into the at least one Internet Protocol packet stream; and
            communicate the at least one Internet Protocol packet stream comprising the images of the updated local user-interface of the computing device and the input entered to the computing device from the computing device directly back to the computing device via a network protocol without communicating the at least one Internet Protocol packet stream through an intervening computing device.

10. The computing device of claim 9, wherein the instructions further cause the hardware processor to:
    display a video that the user is mandated to watch on the local user-interface of the computing device; and
    analyze the at least one Internet Protocol packet stream including the images of the updated local user-interface to determine whether the user has watched the video that the user is mandated to watch.

11. The computing device of claim 9, wherein the instructions further cause the hardware processor to:
    include, in the at least one Internet Protocol packet stream, keystroke data indicating keystrokes entered by the user during the remote user session and mouse data indicating mouse position, mouse movement, and mouse clicks entered by the user during the remote user session.

12. The computing device of claim 11, wherein the keystroke data and mouse data are included in an input packet stream of the at least one Internet Protocol packet stream and the images of the local user-interface are included in an output packet stream of the at least one Internet Protocol packet stream.

13. The computing device of claim 12, wherein the instructions further cause the hardware processor to:

send the at least one input packet stream and the at least one output packet stream to a second computing device for analysis.

14. A method comprising:

by a single computing device:

capturing a computing experience on the single computing device using a remote user session that is executing on the single computing device, wherein the computing experience includes user-input entered by a user as the user interacts with the single computing device during the remote user session and a local user-interface generated by the single computing device as the user enters the user-input;

as the user continues interacting with the single computing device during the remote user session:

representing both the user-input and the local user-interface in at least one Internet Protocol packet stream that includes images of the local user-interface as well as input data representing the user-input;

redirecting the at least one Internet Protocol packet stream from the single computing device to the single computing device where the remote user session is executing, the at least one Internet Protocol packet stream being redirected via a network port of the single computing device via a network protocol; and updating a display of the single computing device using the images of the local user-interface included in the at least one Internet Protocol packet stream, the display being updated based on the user-input entered to the single computing device by the user.

15. The method according to claim 14, further comprising:

analyzing the at least one Internet Protocol packet stream to determine that the user started playing a song or movie on the single computing device; and detecting that the user did not have digital rights management permission to play the song or movie on the single computing device.

16. The method according to claim 15, further comprising:

stopping the song or the movie from playing on the single computing device responsive to the analyzing the at least one Internet Protocol packet stream revealing that the user did not have the digital rights management permission to play the song or the movie on the single computing device.

17. The method according to claim 14, further comprising:

analyzing the at least one Internet Protocol packet stream to detect that the user accessed inappropriate content using the single computing device; and responsive to detecting that the user accessed the inappropriate content, causing a source of the inappropriate content to be blocked.

18. The method of claim 14, further comprising:

analyzing the at least one Internet Protocol packet stream to detect that the user accessed inappropriate content using the single computing device; and responsive to detecting that the user accessed the inappropriate content, adjusting a permission level to lower a level of authorization available to the user on the single computing device.

19. The method of claim 14, further comprising:

analyzing the at least one Internet Protocol packet stream to determine an amount of time that the user viewed the inappropriate content on the single computing device; and distinguishing between inadvertent user access of the inappropriate content and intentional user access of the inappropriate user content based on the amount of time that the user viewed the inappropriate content on the single computing device.

20. The method of claim 14, further comprising:

causing a local printer of the single computing device to appear as a remote printer instead of as the local printer.

* * * * *